March 14, 1950     N. K. MORRIS     2,500,560
METAL COMBINED SHREDDER AND GRATER
Filed Feb. 7, 1947

Inventor
Nathan K. Morris,
By Jacobi & Jacobi
Attorneys

UNITED STATES PATENT OFFICE 2,500,560

METAL COMBINED SHREDDER AND GRATER

Nathan K. Morris, Asbury Park, N. J.

Application February 7, 1947, Serial No. 727,083

1 Claim. (Cl. 146—180)

This invention relates to a combined grater and shredder and it is one object of the invention to provide a kitchen implement of this character of such construction that it may be formed from a single blank of sheet metal stamped to provide a body having a grater of improved construction occupying its central portion between columns of shredders and cutters, the scraping bars extending transversely and longitudinally of the body of the implement in intersecting relation to each other and so formed that they are provided with teeth upon their outer surfaces.

Another object of the invention is to provide a kitchen implement wherein the bars of the grater are punched from their rear surfaces to form outstanding forwardly projecting teeth, the bars being crimped transversely from opposite side edges so that their side portions project rearwardly and reinforce the scraper bars as well as causing the teeth to be quite pronounced and their scraping action not interfered with by side portions of the bars.

Another object of the invention is to provide a grater wherein the forwardly punched teeth of adjoining bars are disposed in staggered relation to each other and a very good scraping action take place when the implement is in use.

Another object of the invention is to provide a combined grater and shredder having the marginal portions of the metal plate from which it is formed bent to form a bordering flange or bead which reinforces the margin of the body portion of the implement and also prevents likelihood of a person's hands being cut while using the device.

Another object of the invention is to provide a combined grater and scraper which is formed of sheet metal by a single stamping operation, is of simple construction, and may be manufactured at low cost.

The invention is illustrated in the accompanying drawings wherein.

Figures 1, 2:
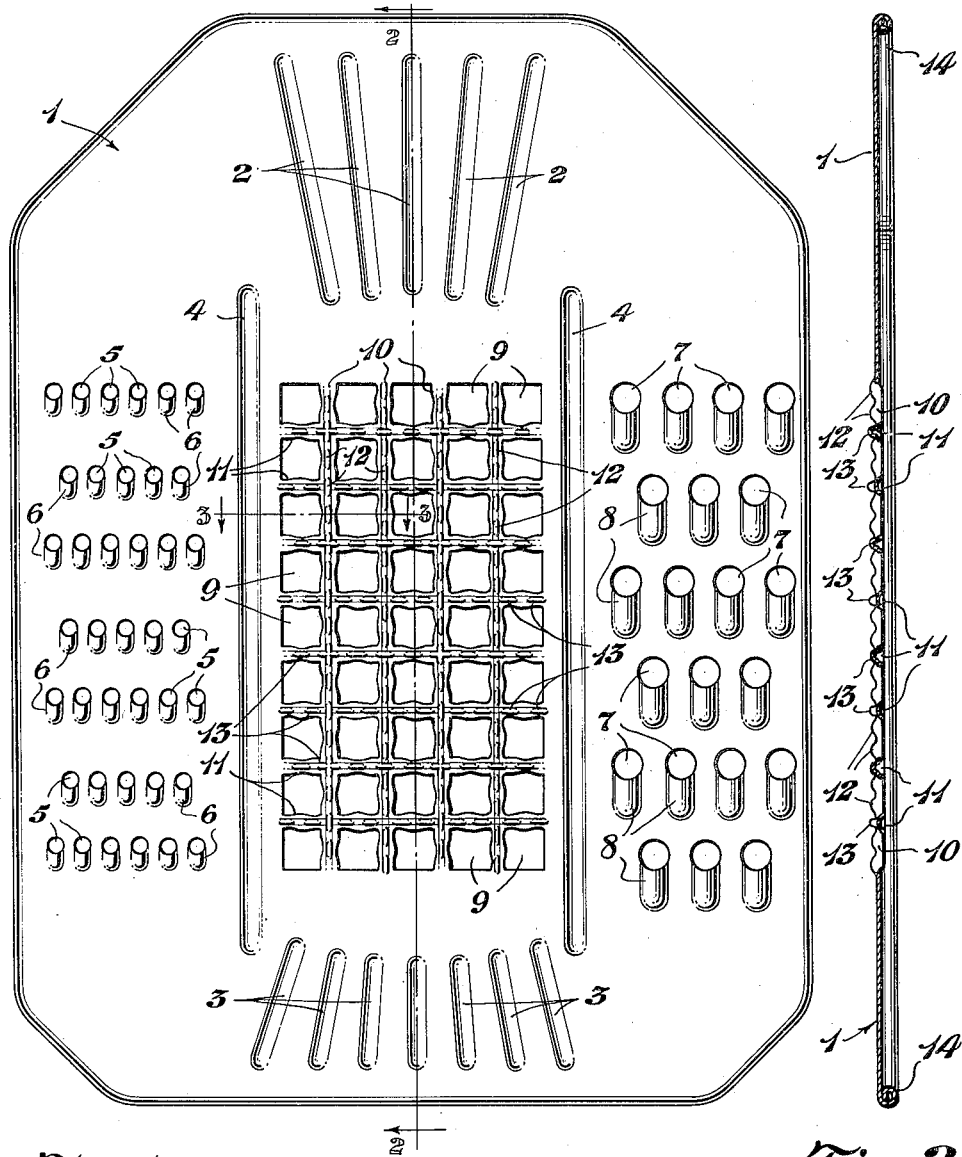
Figure 1 is a front view of the improved grater and shredder.
Figure 2 is a sectional view taken longitudinally of the implement along the line 2—2 of Figure 1.

This improved kitchen implement is formed from a blank of sheet metal and has a flat body 1 which may be of any desired length and width and has its corners cut diagonally so that the implement may be conveniently held diagonally in a transversely tilted position during use, if so desired. During manufacture of the implement, the sheet metal blank is stamped to form longitudinally extending rearwardly projecting reinforcing ribs 2 and 3 and also ribs 4 between which inner ends of the ribs 2 and 3 extend. The ribs 4 are spaced from each other transversely of the body of the implement and divide the body into a central portion and side portions, the side portions being cut and stamped to form openings 5 and 7 and shredders 6 and 8 which project forwardly from the body and have transversely arcuate upper edges which are sharp so that when vegetables are held against the side portions of the body and moved back and forth along the body portions will be shredded from the vegetables and pass through the openings 5 and 7 and onto a table, board, or plate over which the implement is held when in use. The openings 5 and companion shredders or blades 6 are smaller than the openings 7 and their companion blades or shredders 8 for selected use by a person using the implement and it will be understood that when the shredders 8 are used, potatoes may be cut into narrow strips and cooked to form shoestring potatoes. The shredders are arranged in columns and in staggered relation to each other so that when vegetables are pressed against the body and moved back and forth between its upper and lower ends, shredding will take place throughout the width of the vegetable being shredded.

Figure 3:
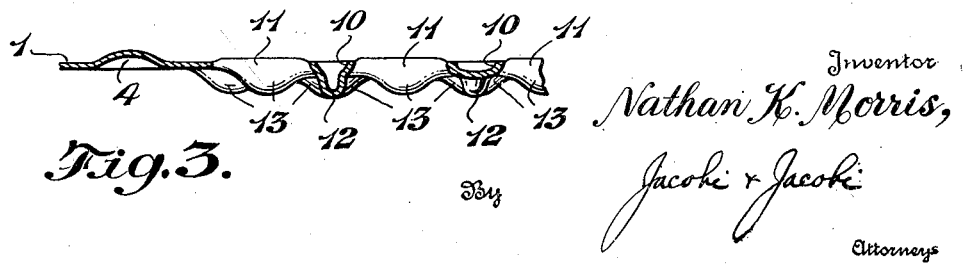
Figure 3 is a fragmentary sectional view upon an enlarged scale taken along the line 3—3 of Figure 1.

The central portion of the body between the ribs 4 is cut and stamped to form substantially square openings 9 and bars 10 and 11, the bars 10 extending longitudinally of the body and the bars 11 transversely thereof in crossing relation to the bars 10. During the cutting and stamping operation, the openings 9 are first formed and the portions of the blank which form the bars are punched from their rear surfaces to form teeth 12 and 13 which protrude forwardly from the bars. Referring to Figure 3, it will be seen that the teeth are hollow and closed along their outer surfaces instead of being formed by cutting slits in the bars. This eliminates narrow slits in which food particles would be liable to accumulate if the teeth were formed by cutting slits in the bars. The teeth are spaced from each other longitudinally of the bars and so arranged that alternate bars have their teeth in staggered relation to each other and a very efficient grating action will take place when vegetables, nuts, or other food items are pressed against the grater and reciprocated longitudinally of the implement or transversely thereof. After the teeth 12 and 13 have been formed, transverse pressure is applied to the bars by portions of the dies with which the device is formed and this transverse pressure causes the bars to be crimped transversely so that the bars are trough-shaped or U-shaped or V-shaped in cross section with open sides of the bars presented rearwardly of the body. This causes the bars to have side wall-portions which reinforces them and prevents the bars from being bent or broken when subjected to pressure exerted while vegetables, or the like, are being grated. Marginal portions of the body are bent and rolled rearwardly to form a rearwardly projecting bead 14 which reinforces the body about its margins and eliminates sharp edges which would be liable to cut the hands of persons using the implement.

From the foregoing description of the construction of my improved metal combined shredder and grater, the operation thereof will be readily understood, and it will be seen that I have provided a comparatively simple, inexpensive and efficient means for carrying out the various purposes and objects of the invention. While I have particularly described the elements best adapted to perform the functions set forth, it is apparent that various changes in form, proportion, and in the minor details of construction may be resorted to, without departing from the spirit or sacrificing any of the principles of the invention.

Having thus described my invention, what I claim is:

A food grater comprising a flat body formed of sheet metal and having a portion cut to form longitudinal and transverse rows of openings and bars extending longitudinally and transversely of the body between the openings and forming the walls thereof, all of said bars having portions thereof punched outwardly to form forwardly projecting grating teeth located midway the width of the bars and spaced inwardly from side edges thereof and spaced from each other longitudinally of the bars and elongated longitudinally of the bars, the teeth of each bar being in staggered relation to the teeth of adjoining bars, and said bars having portions between the openings substantially U-shaped in cross section and open along their rear sides and having rearwardly extending opposed wall portions constituting reinforcements for the bars.

NATHAN K. MORRIS.

REFERENCES CITED

The following references are of record in the file of this patent:

UNITED STATES PATENTS

| Number | Name | Date |
| --- | --- | --- |
| D. 99,361 | Moran | Apr. 21, 1936 |
| 105,958 | Lusher | Aug. 2, 1870 |
| 633,472 | McLellan | Sept. 19, 1899 |
| 917,251 | Clement | Apr. 6, 1909 |
| 919,850 | Goulet | Apr. 27, 1909 |
| 1,271,787 | Smith | July 9, 1918 |
| 1,462,801 | De Luca et al. | July 24, 1923 |
| 1,915,869 | Rowley | June 27, 1933 |
| 2,413,151 | Nu Dell | Dec. 24, 1946 |